Jan. 2, 1968     C. H. DENKER     3,361,179
TIRES WITH SHORT LENGTHS OF WIRE IN THE TREAD
Filed Feb. 4, 1966

INVENTOR.
CARL H. DENKER
BY
J.B. Holden
ATTORNEY 3,361,179
TIRES WITH SHORT LENGTHS OF WIRE
IN THE TREAD
Carl H. Denker, Akron, Ohio, assignor to The Goodyear Tire & Rubber Company, Akron, Ohio, a corporation of Ohio
Filed Feb. 4, 1966, Ser. No. 525,215
2 Claims. (Cl. 152—354)

ABSTRACT OF THE DISCLOSURE

Two layers of short lengths of wire are provided under the tread surface of a tire to prevent penetration of sharp objects. The concentration of wire lengths in the radially inward wire-containing layer is greater than in the radially outward-containing layer; said concentration in the radially inward layer being so great that if it were adjacent the tread there would be danger of tread separation.

---

This invention relates to an improvement in a pneumatic tire between the carcass and the tread surface. The invention may be utilized in a passenger tire, or a truck tire, or an off-the-road or other pneumatic tire. It has particular value in an airplane tire. The tire may be a radial-ply tire or a bias-ply tire; it may be a tubeless tire or a tire provided with a tube.

Dobson U.S. Patent 3,133,583 describes an airplane tire with a ply or portion of rubber compound containing short lengths of shredded wire located in the under tread. The short lengths of wire increase the resistance of the tire to penetration of sharp objects which may damage the carcass. However, the short lengths of wire stiffen the portion of the tire containing them, and if this portion is stiffened sufficiently by the presence of a large amount of wire, the repeated flexing, to which the tread is subjected when the tire is in use, causes the tread to separate from the stiffened portion of the tire.

According to this invention, there is employed in the under-tread portion of the tire, a concentration of wire which is much greater than would normally be possible without resulting in separation of the tread from the under tread. This improvement accomplished by employing an additional wire-containing ply or portion over the portion containing the high concentration of wire, and in this additional or outer wire-containing portion, the concentration of the wire is less than in the inner portion of higher wire content. Thus, the wire concentration decreases from a higher concentration adjacent the carcass to a lesser concentration nearer the tread surface. There may be more than two such plies with each ply or layer having a lesser concentration of wire than the underlying layer, and, if desired, the entire tread may contain short lengths of wire. In any event, the concentration of wire will progressively decrease from a portion adjacent the carcass toward the outer surface of the tire. The stiffness or modulus of the tread thus progressively decreases from the inner portion having the greatest concentration of wire to an outer portion of rubber and wire or to the outer wire-free tread portions, as the case may be.

The invention is further described in connection with the accompanying drawings, in which—

Figure 1:
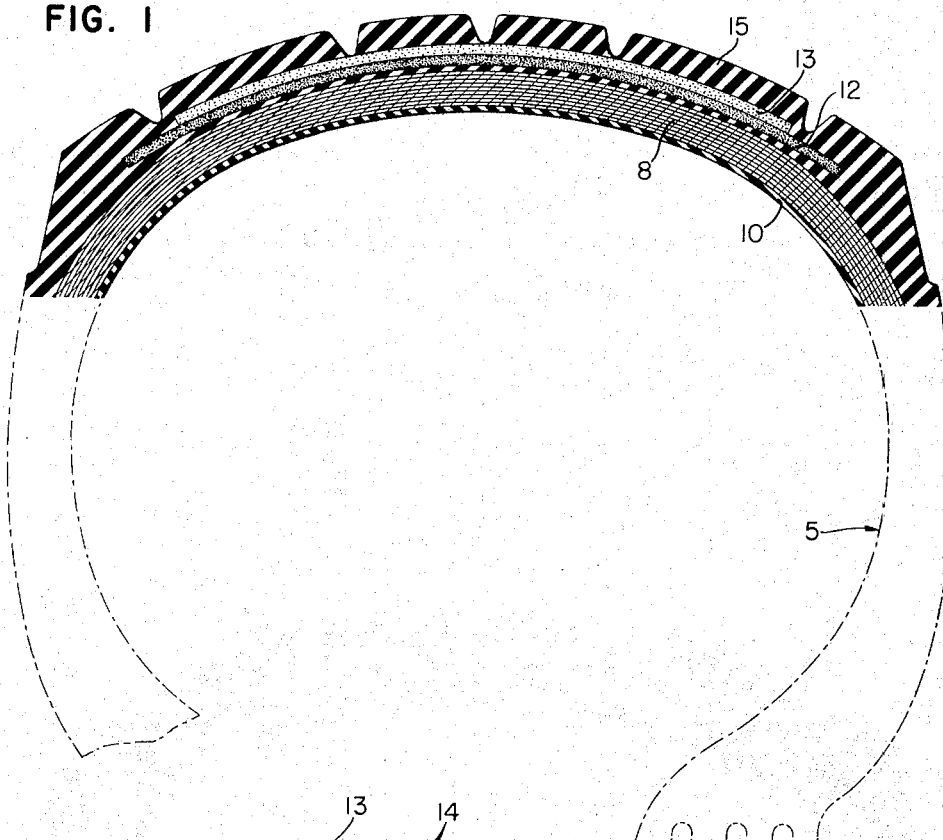
Figure 2:
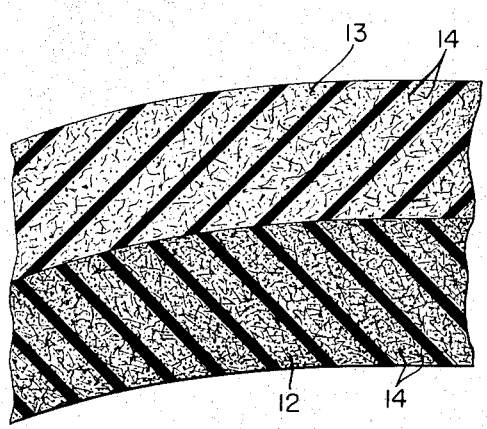

FIGURE 1 is a radial section through a pneumatic tire showing two adjacent portions each containing a different content of wire; and FIGURE 2 is an enlarged sectional detail of FIGURE 1 showing the higher concentration of short lengths of wire in the inner portion than in the outer portion.

The tire 5 is constructed with one or more beads 6 in each bead portion and any suitable number of carcass plies 8. These carcass plies may be bias cut or they may be radial. If the tire is a tubeless tire it may include a liner 10.

Over the carcass are two wire-containing layers or portions 12 and 13. The wire 14 is preferably steel wire which is brass coated to provide a good bond with the rubber. These short lengths of wire may measure from about ¼ inch to 2 inches, or thereabouts. They are incorporated in the rubber in any usual manner of incorporating an additive in rubber, as by adding the short lengths of wire to the rubber on a rubber mill. In accordance with the invention, the concentration of the wire lengths in the inner portion 12 is so great that this portion is sufficiently stiff to cause it to separate from the tread 15 when the tread is subjected to repeated flexing in use, if this portion 12 and the tread were adjacent one another. The wire concentration in this inner portion 12 may, for example, be 20 percent or even more, by weight of the rubber-wire compound.

In the outer portion 13 there is a lower concentration of the wire lengths, and this may for example be 10 or 15 percent or less, as, for example, 6 or 8 percent, by weight of the rubber-wire compound. During vulcanization this portion 13 is strongly bonded to the portion 12 and also to the tread 15. As noted above, if the tread 15 were bonded directly to the stiffer portion 12 it would separate from the portion 12 during use. By providing the more flexible and elastic portion 13 between the inner portion 12 and the tread, a strong bond is provided between the tread and the inner portion. The concentration of short lengths of wire in the portion 13 is sufficiently low that this portion flexes readily. It does not flex as readily as a portion which contains no short lengths of wire, but is stiffer and therefore has increased the compatability with the inner portion 12. The concentration of short wires in the portion 13 is sufficiently lowered that it is quite elastic and has substantial elongation, and therefore as the tire is flexed in use, this portion 13 acts as a buffer layer between the layers 12 and 15 and prevents separation.

The concentration of short lengths of wire incorporated in the different rubber compounds will depend upon the size of the tire, the speeds at which used, the curvature of the tread, the number of plies in the carcass, the modulus of the various rubber components of the tire, the sidewall structure, etc. In a 46 x 16 airplane tire intended for use at 200 m.p.h., it has been found that good results are obtained using an inner layer 12 containing 16 percent of short wires, based on the weight of the rubber-wire compound of this layer and an outer layer 13 containing 10 percent of short wires, based on the weight of the rubber-wire compound of this layer. In this manner superior cut resistance is obtained by a high concentration of wire in the layer 12 while avoiding danger of tread separation.

While the invention has been described in terms of two next adjacent wire-containing layers, it will be apparent that more than two such layers may be used with a progressive decrease in percentage of wire from the innermost layer and radially outwardly of the tire. If desired, the entire tread portion outwardly of the carcass may contain wire. For example, the tread might be divided into three zones, an innermost zone having 15 percent or more of wire, an intermediate zone having 10-15 percent of wire, and an outer zone having 2½-10 percent of wire. Also, it will be apparent that while the wire containing portions or layers have been described as lying next to each other, two next adjacent wire-containing portions might be separated by a thin layer of gum rubber or the like without departing from the invention.

The invention has been described in terms of the use of shredded wire to provide the desired cut-resistant characteristic in a tire. However, the invention is not limited to the use of shredded wire but rather includes the use of any suitbale material of any suitable form which, when included within the rubber which in part forms the portions, as at 12 and 13, will provide these portions with a cut resistance superior to that of the rubber alone; therefore, when the term wire is used herein, including the appended claims, it is to be understood that this term includes any discrete filament, particle, fragment, or the like of any suitable material which when uniformly dispersed in rubber will provide a material having a cut resistance substantially greater than that of the rubber alone. Also, where the term "rubber" is used it is intended to mean natural or synthetic rubber or other rubber-like material suitable for use in the manufacture of pneumatic tires.

Thus, it will be seen that there has been provided a novel and improved pneumatic tire, particularly adapted for use on aircraft having high landing and take-off speeds, wherein the tire is provided with substantially increased cut resistance by reason of an innermost wire-containing portion, or portions, having such a high concentration of wire that if used alone separation of the tread would result; and by reason of a wire-containing portion, or portions, between the aforesaid and the tread surface, having reduced concentration of wire, as compared to the innermost wire-containing portion or portions there is provided a progressive and sufficient reduction in modulus in a direction toward the outer tread surface that tread separation is satisfactorily minimized, if not eliminated.

The invention is covered in the claims which follow.

What I claim is:

1. In a pnumatic tire having two plies near the tread surface containing short lengths of wire to provide improved cut resistance, the improvement in which one of said plies is outside of the other, the concentration of short wire lengths in the radially inward wire-containing ply is greater than in the radially outward wire-containing ply, and said concentration in the radially inward ply is so great that if the same concentration were adjacent the tread there would be danger of separation of the tread therefrom when the tire was flexed in use.

2. The tire of claim 1 in which rubber containing no wire is located between said two wire-containing portions.

References Cited

UNITED STATES PATENTS 2,960,139  11/1960  Engstrom et al. _____ 152—354
3,205,928  9/1965   Fishman _____ 152—323 X ARTHUR L. LA POINT, *Primary Examiner.*

Y. P. SCHAEVITZ, *Assistant Examiner.*